April 2, 1946. C. J. ARMBRUST 2,397,459
GRINDING APPARATUS
Filed Dec. 16, 1943 4 Sheets-Sheet 1
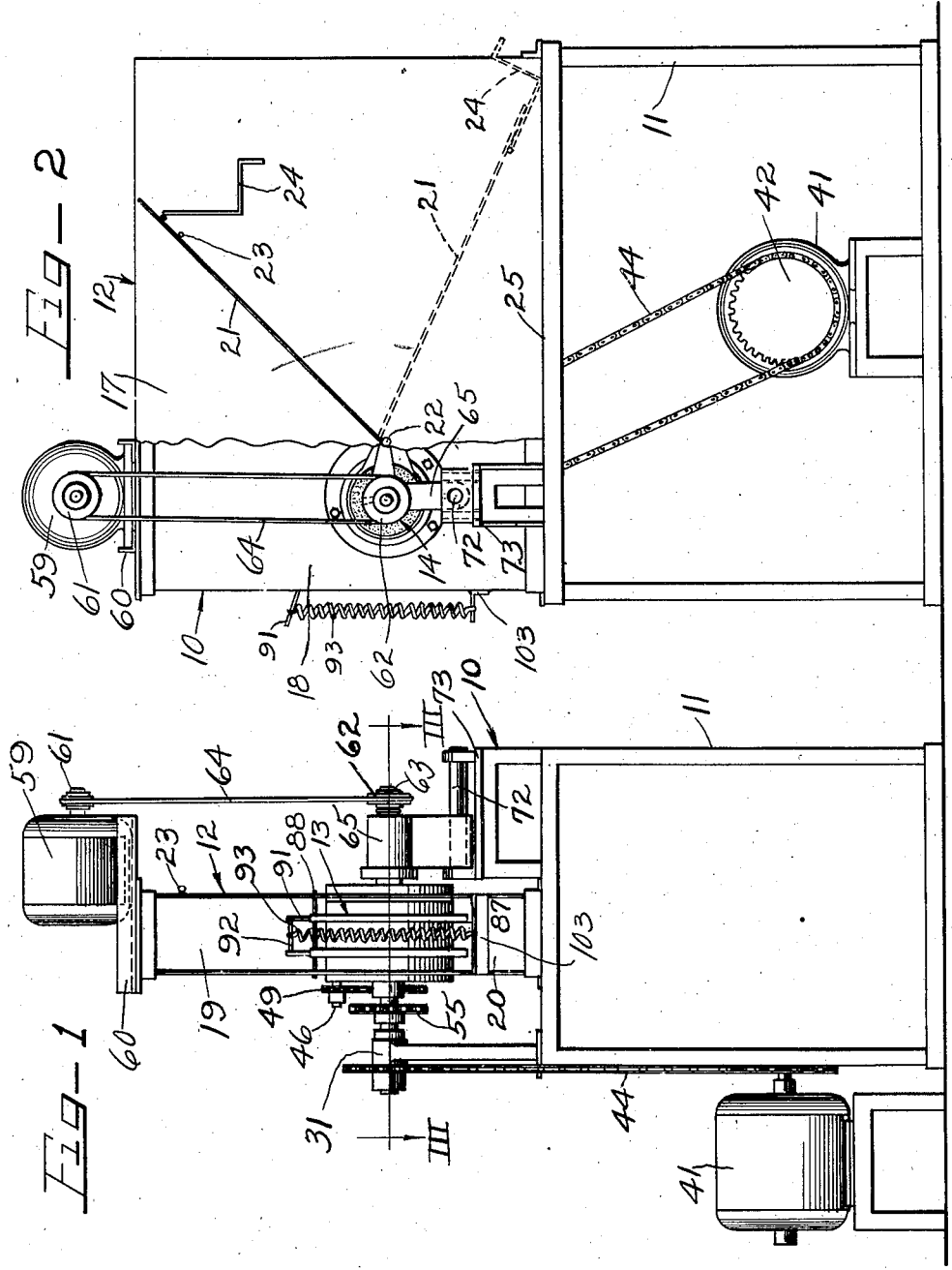
Inventor
Christopher J. Armbrust
by Charles K. Kidd Attys

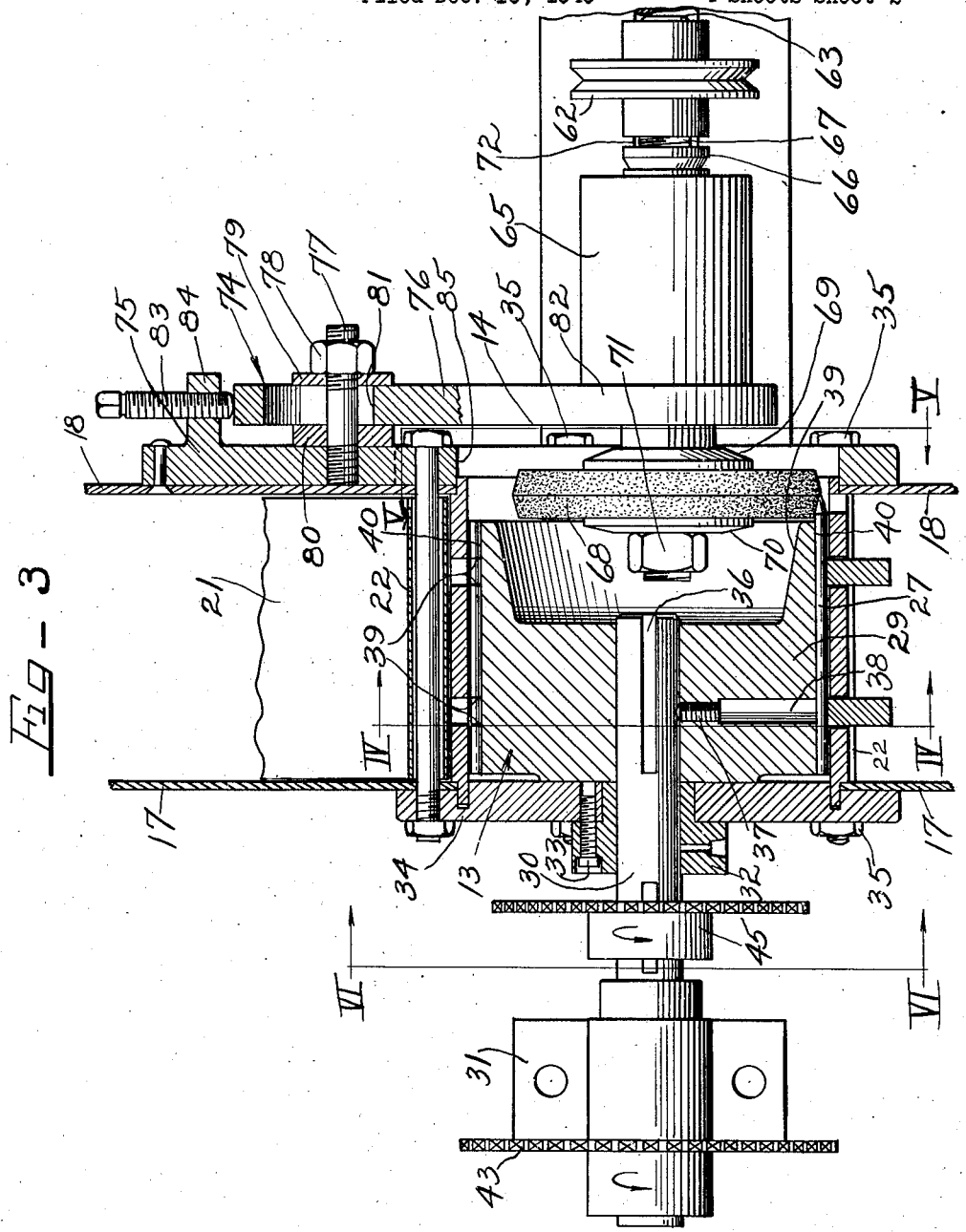

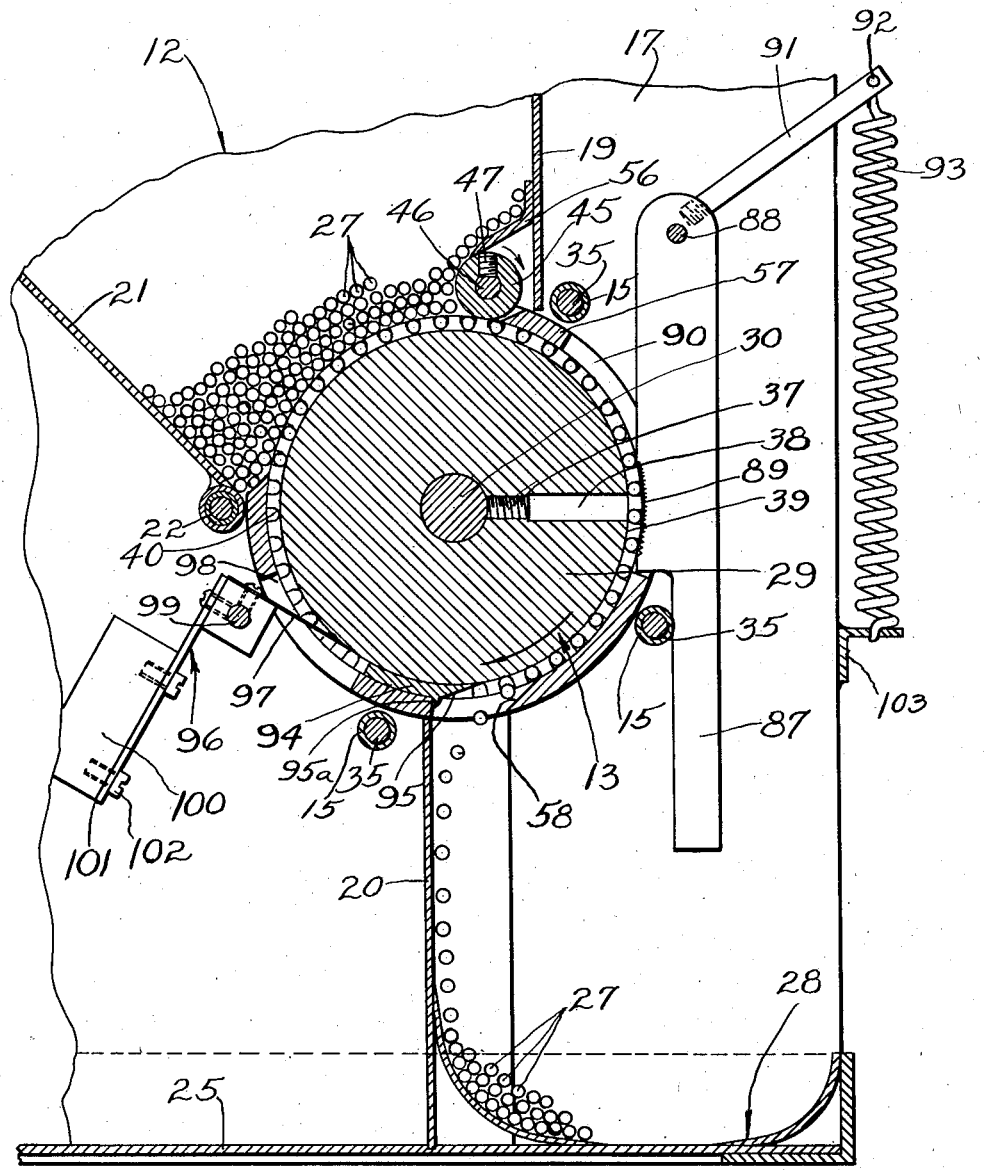

April 2, 1946.  C. J. ARMBRUST  2,397,459
GRINDING APPARATUS
Filed Dec. 16, 1943  4 Sheets-Sheet 4
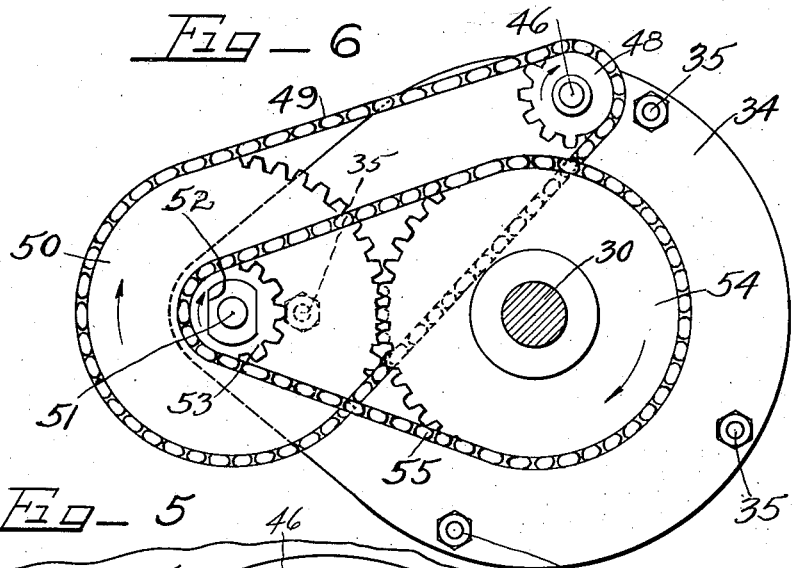
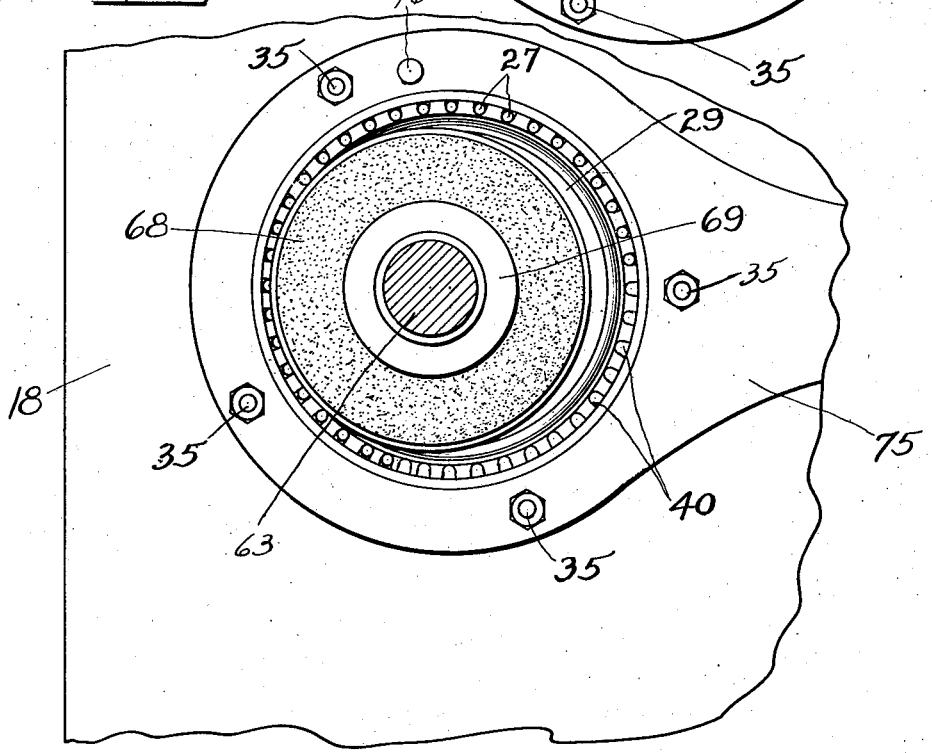
Inventor
Christopher J. Armbrust Patented Apr. 2, 1946

2,397,459

UNITED STATES PATENT OFFICE 2,397,459

GRINDING APPARATUS

Christopher J. Armbrust, Winfield, Ill., assignor to National Pectin Products Company, Cicero, Ill., a corporation of Illinois Application December 16, 1943, Serial No. 514,449

9 Claims. (Cl. 51—108)

The present invention relates to a method of and means for automatically shaping work pieces by a grinding operation. More particularly, the invention is concerned with a method of and apparatus for automatically feeding a plurality of work pieces to a rotating abrasive means for shaping said work pieces to a predetermined pattern.

The method and apparatus of the present invention are particularly advantageously adapted to use in such operations as the forming of large quantities of holders or sticks all of which are to have a substantially uniform shape for assembly into cartons for employment in serving confections or the like. In assembling a confection carton, a holder having a pointed or substantially cone-shaped end portion is desired. To produce large quantities of such cartons according to modern production methods economically, it is advantageous to devise a method and apparatus which will provide uniformly shaped holders or sticks so that any one of those produced will be exactly interchangeable in the assembling operation.

It is therefore an object of the present invention to provide a method of and apparatus for producing according to a grinding operation large numbers of uniformly shaped work pieces.

It is a further object of the present invention to provide a method of and means for automatically feeding the work pieces to be conformed to a given pattern to a grinding means.

It is a still further object of the present invention to provide a novel method of positioning a plurality of work pieces in uniformly spaced relation to each other so as to be subjected to a grinding operation to render the work pieces which will conform to a desired uniform shape.

It is a further object of the invention to provide apparatus for accomplishing the aforementioned result and which will in addition rotate the work piece while it is in contact with the abrasive surface so as to render it completely uniform as to its shape and conforming the same to a given pattern.

Other features and objects of the present invention will become apparent as the detailed description of the annexed sheets of drawings which illustrate a preferred embodiment of the inveniton proceeds.

On the drawings:

Figure 1 is an end elevation of one form of apparatus embodying the principles of the present invention;

Figure 2 is a side elevation of the apparatus in Figure 1 with parts broken away for the sake of clearness;

Figure 3 is a horizontal cross section taken through the apparatus illustrated in Figure 1 of the drawings as seen from the line III—III therein;

Figure 4 is a vertical cross section taken along the line IV—IV in Figure 3;

Figure 5 is a vertical cross section through the apparatus shown in Figure 3 of the drawings and taken along the line V—V therein; and Figure 6 is an end elevation of the driving means for the apparatus illustrated in Figures 1 to 3, inclusive, and as seen generally from the line VI—VI in Figure 3.

As shown on the drawings:

The automatic grinding machine which embodies the principles of the present invention is indicated generally by the reference character 10 in Figures 1 and 2 of the drawings. The apparatus comprises a platform or base 11 on which is mounted a bin or hopper 12 adjacent to which is disposed a feeding means 13. Associated with the feeding means 13 is an abrasive means which may take the form of a grinding unit 14. The hopper 12 is adapted to receive a plurality of work pieces which are to be successively introduced by the feeding means to the grinding unit 14.

The hopper 12 is advantageously formed of at least two parallel substantially vertical walls 17 and 18. The walls 17 and 18 are preferably spaced apart a distance substantially equal to a dimension of the work piece when it is disposed in the relation in which it is to be presented to the feeding means 13 for the accomplishment of the grinding operation so as to prevent such pieces from becoming jammed. One end of the hopper 12 is closed by a substantially vertical partition made up of an upper wall portion 19 and a lower wall portion 20 between the lower and upper ends, respectively, of which is disposed the feeding means 13. The other end of the hopper 12 is at least partially closed by a short tiltable wall portion 21 the lowermost end of which is disposed adjacent the feeding means 13 and secured in any suitable fashion to a pivotal mounting means which may take the form of a substantially horizontally extending tube 22 disposed about one of the bolts 35 which with spacers 15 serve to support and space the vertical walls 17 and 18.

The tiltable wall 21 is disposed in inclined relation between the vertical walls 17 and 18 as by means of a horizontally disposed removable pin 23 inserted in apertures in said walls. The wall 21 is provided with a hinged extension 24 secured to said wall adjacent its free end in such fashion that when the wall 21 is tilted downwardly on the removal of pin 23 as indicated by the dotted line position in Figure 2, the extension 24 will support the same from the base 25 of the hopper 12 and will serve to retain the supply of work pieces supported by the wall 21 in the hopper 12 whenever it is desired to have access to the feeding means 13. The above described arrangement provides a means of removing the work pieces from the hopper 12 in the event that it becomes necessary or desirable to obtain access to the feeding means 13 or by any other parts in the interior of the apparatus.

It will be understood from an inspection of Figure 4 of the drawings that the hopper 12 is adapted to accommodate within walls 17 and 18, the upper wall portion 19 and the tiltable wall 21 the work pieces which, in this case, are illustrated as being a plurality of generally cylindrical pieces or sticks 27 of a length substantially equal to the spacing between the walls 17 and 18. The hopper 12, therefore, forms a substantially open-ended funnel member for supplying the sticks 27 to the feeding means 13. The sticks 27, after they have been subjected to the abrasive means 14 by the feeding means 13, are deposited in the receptacle 28 and are thereafter ready for use in whatever manner they are intended to be employed.

Turning our attention now to the feeding means 13 in particular, we find that it includes a drum 29 which is secured adjacent the free end of a cantilever shaft 30. The shaft 30 is rotatably supported in a vertically extending bearing bracket 31 secured in any suitable fashion to the frame 11 and a bearing 32 mounted as by means of a plurality of bolts 33 threaded into substantially circular casting 34 secured to the wall 17 as by means of the bolts 35 which extend through walls 17 and 18. The drum 29 is fastened to the shaft 30 for rotation therewith as by means of a key (not shown) which registers with a keyway 36 and a set screw 37 threaded into the drum 29 at the base of a bore 38 formed in one of a plurality of annular grooves 39 spaced about the periphery of the drum 29. The end of the drum 29 adjacent the free end of the shaft 30 on which the drum is mounted is provided with a concave face 39. The periphery of the drum 29 also has a plurality of uniformly spaced axially extending grooves 40 formed thereon to receive the sticks 27 from the feeding means 13 as the drum 29 is rotated by the shaft 30 past the open end of said feeding means.

The rotation of the shaft 30 for driving the drum 29 may be accomplished by any suitable power source such, for example, as the motor 41, the sprocket wheel 42 of which actuates the sprocket 43 secured to the shaft 30 by means of the chain 44. The drum 29 is rotated in the direction indicated by the arrow shown in Figure 4 of the drawings.

To aid in the distribution of the sticks 27 and to insure that only a single such stick is disposed in each individual groove 40 on the periphery of the drum 29, a rotating roller 45 is provided and secured to the horizontal shaft 46 as by means of a set screw 47. The roller 45 is rapidly rotated by the shaft 46 which is actuated by a small sprocket 48 of a driving means such, for example, as that shown in Figure 6 of the drawings. The sprocket 48 is driven by the chain 49 which passes around a sprocket 50 mounted upon a stub shaft 51 non-rotatably mounted upon the casting 34 secured to the wall 17 of the hopper 12. A sprocket 54 secured to the shaft 30, actuated by the motor 41 in the manner previously described, drives a small sprocket 53 through the chain 55. By reason of the squared end 52 of the hub of the sprocket 50 upon which the small sprocket 53 is mounted, said sprocket 53 serves to drive the sprocket 50 which, as we have seen, drives the small sprocket 48 on the shaft 46 for the roller 45.

The roller 45 is advantageously disposed adjacent the end wall 19 of the hopper 12 and contacts the periphery of the drum 29. As the roller 45 is rotated at a speed considerably greater than the speed of rotation of the drum 29, the sticks 27 which endeavor to move along with the moving surface of the drum 29 are prevented from so doing and the danger of jamming of the sticks between the feeding means 13 and the end wall 19 is thereby alleviated. The roller 45 also insures that at least one of the sticks 27 will be disposed in each of the grooves 40 on the drum 29. A shield 56 is secured to the end wall 19 directly above and barely out of contact with the surface of the roller 45 at a point substantially diametrically opposed to that portion of its surface which is in contact with the drum 29 so as to prevent any of the sticks 27 from getting down between the roller 45 and the end wall 19.

In order to hold the sticks 27 in place in the grooves 40 of the drum 29, a stationary housing 57 of substantially cylindrical form is provided closely fitting around the external periphery of the drum 29. The housing 57 is open in that portion of its periphery which registers with the open end of the hopper 12 and is also provided with a plurality of slots extending therethrough to the surface of the drum 29 for purposes which will be explained in detail hereinafter. An opening 58 is also provided in the housing 57 at a point substantially diametrically opposed to the location of hopper 12 to permit the sticks 27 after they have passed the grinding unit 14 to be discharged into the receptacle 28.

The grinding unit 14 is actuated by a motor 59 disposed upon an adjustable mounting 60 secured to the uppermost end of the hopper 12. The pulley 61 of the motor 59 is operatively connected as by means of a belt 64 or other suitable driving connection with a pulley 62 the hub of which is secured to a horizontal shaft 63 for the grinding unit 14. The shaft 63 is rotatably supported in the adjustable bearing bracket 65 and is held therein in proper endwise disposition by means of an adjusting nut 66 which is threaded upon a short threaded section 67 on the shaft 63. A grinding wheel 68, which may be made of any suitable abrasive material, is mounted upon the end of the shaft 63 projecting through the bearing bracket 5. The wheel 68 is positioned against a flanged portion 69 on said shaft being secured in place thereagainst by a washer 70 and a nut 71 threaded on the end of the shaft 63.

A suitable adjusting means is advantageously provided whereby the grinding wheel 68 of the abrasive means 14 is adapted to be shifted to permit adjustment depending upon the character of the pattern or the shape to be produced on the work piece for the manufacture of which the machine is to be employed. In this case, the beveled periphery of the grinding wheel 68 is adapted to produce pointed ends on sticks 27 as they are carried on the periphery of the drum 29 in contact with the abrasive means 14. The bearing bracket 65 is adapted to be slidably shifted along a bar 72 which is secured at the ends thereof in a support 73 mounted upon the frame 11 of the machine. The axis of the shaft 63 is also adapted to be offset with respect to the axis of the shaft 30 upon which the drum 29 is mounted for rotation by means of the assembly 74.

A casting 75 is secured to the wall 18 of the hopper 12 as by means of the several bolts 35 which also support the casting 34 on the wall 17. The housing 57 is advantageously supported between the castings 34 and 75 about the periphery of the drum 29 in the manner shown in Figure 4.

The arm 76 of the assembly 74 for adjusting the offsetting of the axis of the shaft 63 with respect to the axis of the shaft 30 is adjustably mounted on the outer face of the casting 75 as by means of a pin 77 which is threaded at both ends, one end being threaded into the casting 75 while the other end is adapted to receive a nut 78 which cooperates with a washer 79 and a slide plate 80 to permit adjustment therebetween of the arm 76 afforded by the elongated slot 81 therein through which the pin 77 extends. The annular portion 82 of arm 76 encircles the shaft 63 and shifts the position of the axis of said shaft 63 as desired by moving the bearing bracket 65 about the bar 72 through a generally arcuate path.

To provide a finer adjustment of the offset of the axis of the shaft 63 with respect to the shaft 30, a square headed bolt 83 is threaded through a boss 84 on the face of the casting 75 so as to register with the free end of the arm 76 of the assembly 74. The bolt 83 serves to complete the adjustment of the position of the arm 76 in the direction of its longitudinal axis after it has been shifted with respect to the pin 77 to substantially the proper position. The assembly 74 permits the adjustment of the shaft 63 not only to change the pattern or shape of the work piece being produced but also to compensate as may be required for the wear of the wheel 68.

It will be understood that with the arrangement of the several parts just described the grinding wheel 68 will be advantageously positioned with the axis of its shaft 63 in offset relation with respect to the axis of the shaft 30 of the drum 29 in order that the surface of the wheel may contact the ends of the sticks 27 as they are carried around the outer periphery of the drum 29 in the manner indicated in Figure 3 of the drawings. The grinding wheel 68 extends through an opening 85 in the casting 75 and the free end of the shaft 63 together with the bolt 71 and the associated washer 70 for holding the wheel in place on said shaft extend into the concave face 39 of the drum 29 in such fashion that the wheel will be free from interference from the end of the drum 29.

In order to insure a completely uniform pattern or configuration for the work pieces, in this case the sticks 27, a pair of bars 87 are swingably supported by a rod 88 which extends horizontally between the walls 17 and 18 of the hopper 12 at a point above the feeding means 13. Each of the bars 87 is provided with an arcuate portion 89 on one of the edges thereof having a plurality of serrations formed thereon. A pair of slots 90 extend through the housing 57 so that each registers with one of the annular grooves 39 in the periphery of the drum 29 to receive a bar 87 therein. Each slot 90 and its associated groove 39 thus enables its bar 87 to contact the sticks 27 and, by reason of the serrations thereon, to cause said sticks to be rolled in the grooves 40 as the drum 29 is rotated.

The position of the bars 87 with respect to the drum 29 is such that, as the sticks 27 are carried about the periphery of the drum to the position at which they contact the grinding wheel 68, they will contemporaneously be contacted by the serrations of the arcuate surface 89 of said bars 87 and will, therefore, be rolled while the grinding operation is taking place. To aid in maintaining the arcuate portions 89 on the edge of the bars 87 in contact with the sticks 27, there is provided a pair of outwardly extending arms 91 threaded into the uppermost ends of the bars 87 above the rod 88 extending therebetween (as indicated in Figure 4) and joined by a cross bar 92 to which is secured a coil spring 93. The spring 93 is maintained in tension by securing the end opposite that connected to the cross bar 92 in any suitable fashion to the frame 11, such, for example, as by hooking the same on an angle 103 secured thereto. The spring 93 serves to bias the bars 87 against the sticks 27 carried by the drum 29.

A pair of scrapers 94 which may advantageously be provided to insure the removal of sticks 27 from the drum 29 are arcuately formed and have pointed ends 95 thereon extending in a direction opposite to that of the rotation of the drum 29. Each scraper 94 is disposed in and adapted to contact the base of one of the annular grooves 39 in the drum 29 to aid in insuring the removal of the sticks 27 from the grooves 40 as the drum is rotated. The scrapers 94 are held in place by one edge of the opening 58 in the housing 57 by means of shoulders 95a depending therefrom.

A second pair of scraper elements 96 may be provided if desired. Each scraper 96 has a blade 97 which extends through a slot 98 in the housing 57 which is disposed at a point between the opening 58 and the bottom of the hopper 12. The blade 97 is adapted to ride in one of the grooves 39. The scraper elements 96 are pivotally mounted about a horizontally disposed rod 99 extending between the walls 17 and 18 of the hopper 12. The blade 97 of each scraper element 96 is held in contact with the base of its groove 39 in the drum 29 as by means of a weight 100 secured to a lever arm 101 as by means of the screws 102 in the manner shown in Figure 4.

The operation of the scrapers 94 and the scraper elements 96 is such as to prevent the possibility of any of the sticks 27 after they have passed the grinding wheel 68 from being retained in grooves 40 on the surface of the drum 29. Certain types of work pieces which may be supported in the drum 29 may become slightly wedged into the grooves 40 and unless they are removed they will be carried through the machine a number of times thereby affecting its efficiency of operation.

In the operation of the automatic grinding machine, a large number of work pieces or sticks 27 are deposited in the hopper 12 in the manner illustrated in Figure 4 with the tiltable wall 21 of the hopper positioned in inclined relation against the pin 23 in the manner shown in Figure 2 of the drawings. As the drum 29 is rotated by the motor 41, the sticks 27 are inserted one at a time in each of the several grooves 40 on the periphery of the drum 29. The roller 45 effectively prevents more than one stick 27 from entering each groove and thus prevents the possibility of jamming of the apparatus.

The drum 29 is rotated in the direction indicated by the arrow in Figure 4 and the sticks 27 are carried around to the point where the grinding wheel 68 is positioned. By reason of the disposition of the wheel 68 with respect to the free end of the drum 29 the sticks are pointed as will be observed from Figure 3 of the drawings. The uniformity of the pointed or cone-shaped ends of the sticks 27 is attributable to the action of the bars 87 in rolling the sticks 27 while they are in contact with the beveled surface of the grinding wheel 68. After having passed by the grinding wheel 68, the sticks 27 still carried in the grooves 40 of the drum 29 are permitted to drop through the opening 58 in the housing 57 encircling the drum and into the receptacle 28 in the manner illustrated in Figure 4.

In the event that any one or more of the sticks 27 fail to drop out of their respective grooves 40 in the drum 29, the scrapers 94, one of which registers with each of the annular grooves 39 cut into the drum 29, serve to remove the sticks as the drum is being rotated past the opening 58. The pointed end 95 of the scraper 94 serves to cam the sticks out of the grooves 40. If any one or more of the sticks 27 should, by reason of their being broken or otherwise enabled to pass by the scrapers 94, they will be removed by the scraper elements 96 also riding in one or more of the grooves 39 of the drum 29. The sticks 27 or parts thereof dislodged from the groove 40 by scraper elements 96 are caused to drop through the opening 98 in the housing 57 to the base 25 of the bin 12.

In the event that it is desired to have access to the feeding means 13, as previously suggested, the tiltable wall 21 may be swung about the bolt 35 on which it is pivotally mounted by the removal of the pin 23 holding said wall 21 in place and allowing it to swing downwardly to the dotted line position indicated in Figure 2 of the drawings. In this position, the extension portion 24 serves to support the tiltable wall 21 in its lowermost position upon the base 25 of the hopper 12. This permits the removal of the supply of sticks 27 then in the hopper without the necessity of having to scoop them out of the space between the end wall 19 and the tiltable wall 21. It will be understood that the tiltable wall 21 may again be positioned in inclined relation with respect to the walls 17 and 18 by swinging said wall 21 back into its original position and replacing the pin 23.

Any suitable means such for example as a suction system may be applied to the housing 57 adjacent the grinding wheel 68 to remove the particles of dust produced by the grinding operation. The structure and arrangement of the several scraper means may be changed if desired.

It will, of course, be understood that various details of construction may be varied through a wide range without departing from the principles of this invention and it is, therefore, not the purpose to limit the patent granted hereon otherwise than necessitated by the scope of the appended claims.

What I claim is:

1. An automatic grinding machine comprising a hopper for supplying a plurality of work pieces to be ground, a drum mounted on a cantilever shaft for rotation about its axis with its periphery disposed adjacent the hopper, means for uniformly spacing the work pieces on the periphery of the hopper, a slotted shield surrounding the periphery of the drum to retain the work pieces in place as the drum is rotated, a grinding wheel adjustably disposed at the free end of the drum to contact the work pieces as they are carried by the rotating drum, means operative through the slotted shield for engaging the work pieces to shift them as they are in contact with the grinding wheel, means operative through the slotted shield for disengaging the finished work pieces from the drum, and means for receiving the finished work pieces.

2. An automatic grinding machine comprising a shaft supported and driven from one end only thereof, a generally cylindrical drum mounted on the other end of the shaft and having a periphery characterized by a plurality of uniformly spaced recesses extending parallel to the longitudinal axis of the drum, a hopper open at one end thereof to supply a plurality of work pieces to the drum periphery, means preventing more than a single work piece being disposed in each recess on the drum periphery, means retaining the work pieces on the drum as it is rotated, a grinding wheel disposed with one face confronting the free end of the drum to contact the work pieces as the drum is rotated, means for adjusting the position of the grinding wheel with respect to said drum to vary the shape of the work piece produced by the grinding operation, means disengaging the finished work pieces from the recesses on the periphery of the drum, and receiving means for said finished work pieces.

3. An automatic grinding machine comprising a shaft supported and driven from one end only thereof, a generally cylindrical drum mounted on the other end of the shaft and having a periphery characterized by a plurality of uniformly spaced recesses extending parallel to the longitudinal axis of the drum, a grinding wheel disposed with one face confronting the free end of said drum, a hopper open at one end thereof to supply a plurality of work pieces to the drum periphery, means preventing more than a single work piece being disposed in each recess on the drum periphery, means retaining the work pieces on the drum as it is rotated, means for frictionally engaging the work pieces in the recesses on the drum to shift said pieces while they are in contact with the grinding wheel, means for adjusting the position of the grinding wheel with respect to said drum to vary the shape of the work piece produced by the grinding operation, means disengaging the finished work pieces from the recesses on the periphery of the drum, and receiving means for said finished work pieces.

4. An automatic grinding machine comprising a drive shaft mounted and driven from one end only thereof, a generally cylindrical drum mounted on said shaft, a plurality of uniformly spaced grooves on the periphery of the drum extending parallel to the axis thereof, an open-ended hopper feeding a plurality of work pieces to the drum, a roller contacting the periphery of the drum and rotating in the same direction as the direction of rotation of the drum, a shield substantially completely enclosing the drum to retain the work pieces in the grooves while the drum is rotated, a rotary grinding wheel disposed adjacent the free end of the drum having its axis of rotation offset from the axis of the shaft, means frictionally engaging the work pieces to rotate the work pieces in each groove in contact with the rotary grinding wheel to produce a symmetrically shaped work piece, and means for discharging the finished work pieces from the grooves on the drum.

5. An automatic grinding machine comprising a drive shaft mounted and driven from one end only thereof, a generally cylindrical drum mounted on said shaft, a plurality of uniformly spaced grooves on the periphery of the drum extending parallel to the axis thereof, an open-ended hopper feeding a plurality of work pieces to the drum, a roller contacting the periphery of the drum and rotating in the same direction as the direction of rotation of the drum, a shield substantially completely enclosing the drum to retain the work pieces in the grooves while the drum is rotated, a rotary grinding wheel disposed adjacent the free end of the drum having its axis of rotation offset from the axis of the shaft, means for adjusting the grinding wheel with respect to the free end of the drum to vary the shape of the work pieces, means frictionally engaging the work pieces to rotate the work pieces in each groove in contact with the rotary grinding wheel to produce a symmetrically shaped work piece, a slot formed in the shield, an annular groove in the periphery of the drum substantially equal in depth to that of the axial grooves, a frictional engaging means disposed in the slot and registering with the annular groove to disengage the finished work pieces from the axial grooves, and means for receiving the finished work pieces.

6. In an automatic grinding machine for shaping work pieces having a feeding means and abrasive means, a hopper for supplying the work pieces to the feeding means for subjection to the abrasive means comprising a base, a plurality of substantially vertical walls about said base, and an additional wall pivotally mounted between two of the vertical walls, said pivotally mounted wall being tiltable with respect to the base to provide access to the interior of the hopper for the removal of the supply of work pieces therefrom.

7. An automatic grinding machine comprising a rotary abrasive surface, means for successively introducing a plurality of work pieces to the abrasive surface, means shifting the position of the work pieces while in contact with the abrasive surface to obtain a symmetrical shape for the work pieces, means discharging the finished work pieces from the introducing means, and means for shifting the rotary abrasive surface longitudinally in the direction of its axis of rotation and in an arcuate path about its axis of rotation far adjusting the abrasive surface with respect to the introducing means.

8. A grinding machine for shaping elongated work pieces comprising a first cantilever shaft, an abrasive disk mounted at the free end of said shaft, a second cantilever shaft having a free end opposed to the free end of said first shaft, a cylinder mounted at the free end of said second shaft and having a concave face confronting said abrasive disk for permitting close approximation of said abrasive disk to the edge of said concave face without contact between the two shaft ends, the periphery of said cylinder being formed to receive said work pieces for introducing end portions thereof to said abrasive disk, and means for varying the alignment of said shafts.

9. A grinding machine for shaping elongated work pieces comprising a first cantilever shaft, an abrasive disk mounted at the free end of said shaft, a second cantilever shaft having a free end opposed to the free end of said first shaft, a cylinder mounted at the free end of said second shaft and having a concave face confronting said abrasive disk for permitting close approximation of said abrasive disk to the edge of said concave face without contact between the two free shaft ends, said cylinder being axially recessed at spaced peripheral localities to receive said work pieces for introducing the same to said abrasive disk, means about said cylinder for retaining said work pieces in said cylinder recesses, means for spinning said retained work pieces while the same are introduced to said abrasive disk, and means for feeding work pieces to said cylinder recesses.

CHRISTOPHER J. ARMBRUST.